(12) United States Patent
Tsung et al.

(10) Patent No.: US 9,786,098 B2
(45) Date of Patent: Oct. 10, 2017

(54) APPARATUS FOR PERFORMING TESSELLATION OPERATION AND METHODS UTILIZING THE SAME

(71) Applicant: MediaTek Inc., Hsin-Chu (TW)

(72) Inventors: Pei-Kuei Tsung, New Taipei (TW); Shou-Jen Lai, Zhubei (TW); Yan-Hong Lu, Hsinchu (TW); Sung-Fang Tsai, Hsinchu (TW); Chien-Ping Lu, Cupertino, CA (US)

(73) Assignee: MEDIATEK INC., Hsin-Chu (TW)

( * ) Notice: Subject to any disclaimer, the term of this patent is extended or adjusted under 35 U.S.C. 154(b) by 198 days.

(21) Appl. No.: 14/791,743

(22) Filed: Jul. 6, 2015

(65) Prior Publication Data

US 2017/0011550 A1    Jan. 12, 2017

(51) Int. Cl.
  *G06T 17/20*  (2006.01)
  *G06T 1/20*  (2006.01)
  *G06T 15/00*  (2011.01)

(52) U.S. Cl.
  CPC .............. *G06T 17/20* (2013.01); *G06T 1/20* (2013.01); *G06T 15/005* (2013.01)

(58) Field of Classification Search
  CPC .................................................. G06T 15/005
  See application file for complete search history.

(56) References Cited

U.S. PATENT DOCUMENTS

| 5,299,309 | A  | * | 3/1994 | Kuo | ........................ | G06F 3/14 345/502 |
| 2010/0033483 | A1 | * | 2/2010 | Stewart | ................ | G06T 15/005 345/426 |
| 2014/0092091 | A1 | * | 4/2014 | Li | .......................... | G06T 15/60 345/423 |

OTHER PUBLICATIONS

Sethia et al., "Equalizer: Dynamic Tunig of GPU Resources for Efficient Execution," IEEE 2014.*

* cited by examiner

*Primary Examiner* — Nicholas R Wilson
(74) *Attorney, Agent, or Firm* — McClure, Qualey & Rodack, LLP (57) ABSTRACT

A rendering method executed by a graphics processing unit includes: loading a vertex shading command from a first command queue to a shader module; executing the vertex shading command for computing the varying of the vertices to perform a vertex shading operation by taking the vertices as first input data; storing first tessellation stage commands into a second command queue; loading the first tessellation stage commands to the shader module; and executing the first tessellation commands for computing first tessellation stage outputs to perform a first tessellation stage of the one or more tessellation stages by taking the varying of the vertices as second input data. The vertex shading command is stored into the first command queue by a first processing unit. The varying of the vertices and the first tessellation stage outputs are stored in a cache of the graphics processing unit.

18 Claims, 6 Drawing Sheets

APPARATUS FOR PERFORMING TESSELLATION OPERATION AND METHODS UTILIZING THE SAME

BACKGROUND OF THE INVENTION

Field of the Invention

The invention relates generally to a graphics processing unit, and a method for operating such a graphic processing unit, and more particularly to techniques for performing tessellation with such a graphics processing unit.

Description of the Related Art

A graphics processing unit (GPU) may implement a graphics processing operation that includes tessellation. To render complex shapes for producing a graphics image for display, the complex shapes usually need to be converted into meshes of rendering primitives, e.g. a plurality of triangles. The process of converting those complex shapes into meshes of rendering primitives is called tessellation. To state it in another way, the tessellation process refers to dividing a portion (referred to as a patch) of the surface of an object into a plurality of smaller portions, and interconnecting the smaller portions together. Typically, tessellation is about converting a coarse surface into a plurality of primitives to result in a higher resolution surface. Yet, receiving information contained within the higher resolution surface may be bandwidth inefficient because the amount of information needed to define the higher resolution surface may be much larger than the amount of information needed to define the coarse resolution surface.

In the past, a CPU and a GPU usually coordinate in a master-slave mode, in which the CPU sends instructions to utilize the GPU for performing specific rendering applications. As technology advances, the GPU itself may generate the instructions, later being executed by itself as well. For instance, in OpenCL 2.0, the GPU is allowed to enqueue commands and/or instructions to itself without interaction with the CPU, which is referred to as kernel enqueueing. Simply put, kernel enqueueing enables a kernel to independently enqueue to a single device; moreover, the kernel may enqueue code and control code execution order on its own. As a result, the GPU may be more flexible and autonomous in performing related computation.

BRIEF SUMMARY OF THE INVENTION

A rendering method and a graphics processing unit (GPU) are provided. The rendering method is executed by a GPU comprising a shader module, a non-shader module and a cache for performing one or more tessellation stages. An exemplary embodiment of the rendering method comprises the steps of: loading a vertex shading command from a first command queue to the shader module, wherein the vertex shading command is stored into the first command queue by a first processing unit; and executing the vertex shading command for computing the varying of the plurality of vertices, wherein loading and executing the vertex shading command is for performing a vertex shading operation by taking a plurality of vertices as first input data; storing first tessellation stage commands into a second command queue; loading the first tessellation stage commands from the second command queue to the shader module; and executing the first tessellation commands for computing first tessellation stage outputs, wherein the varying of the plurality of vertices and the first tessellation stage outputs are stored in the cache, wherein storing, loading and executing the first tessellation stage commands is for performing a first tessellation stage of the one or more tessellation stages by taking the varying of the plurality of vertices as second input data.

An exemplary embodiment of the GPU for performing a vertex shading operation and one or more tessellation stages is provided. The GPU comprises a non-shader module, a shader module, and a cache. The a non-shader module is configured for: loading a vertex shading command from a first command queue in performing the vertex shading operation, wherein the vertex shading command is stored into the first command queue by a first processing unit; and loading first tessellation stage commands from a second command queue in performing a first tessellation stage of the one or more tessellation stages. The shader module is configured for: executing the vertex shading command from the non-shader module for computing the varying of a plurality of vertices in performing the vertex shading operation, wherein the vertex shading operation takes the plurality of vertices as first input data; storing the first tessellation stage commands into the second command queue in performing the first tessellation stage of the one or more tessellation stages; and executing the first tessellation commands from the non-shader module for computing first tessellation stage outputs by taking the varying of the plurality of vertices as second input data in performing the first tessellation stage of the one or more tessellation stages. The cache is configured for storing the varying of the plurality of vertices and the first tessellation stage outputs.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
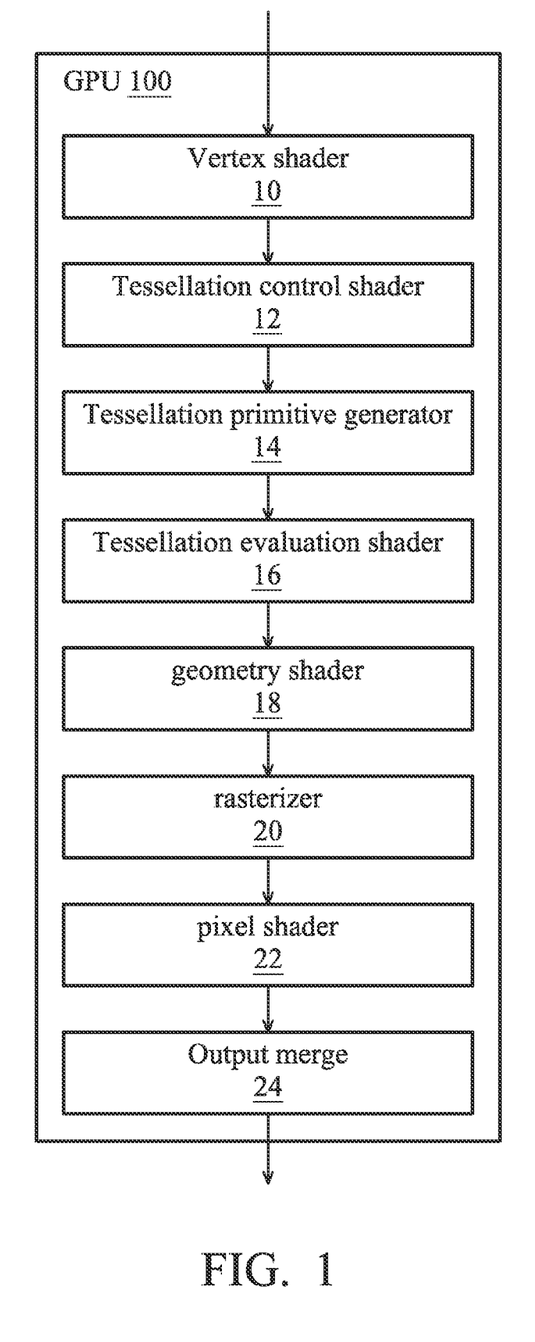
FIG. 1 illustrates a typical portrait of a GPU from graphics processing pipeline perspective.

FIG. 1 illustrates a portrait of the GPU 100 from graphics processing pipeline perspective. The GPU 100 implements a graphics processing pipeline that includes the shading stages of the vertex shader stage 10, the tessellation control shader (TCS) stage 12, the tessellation primitive generator (TPG)

stage 14, the tessellation evaluation shader (TES) stage 16, and the geometry shader stage 18. The GPU 100 may include more shading stages than those illustrated here while in some examples, the GPU 100 may not necessarily include all of the illustrated stages. These shading stages may be defined by software or firmware executing on GPU 100 or by fixed-function units (quite often, the TPG stage is implemented by fixed-function units) that are hardwired for specific operation. The software or firmware executing on the GPU 100 may be referred to as shaders, which provide users with functional flexibility because a user can design the shaders to perform desired tasks in any reasonable manner. To perform the shading stages shown, the shaders may be designed using program codes that start with vertex shading commands and end with geometry shading commands, with tessellation control shading commands, tessellation primitive generator commands and tessellation evaluation shading commands in between, where said commands are issued forth to the GPU 100 by, say a CPU, so as to execute the corresponding shading stages. To begin with, the CPU may provide a plurality of vertices to the GPU 100 while issuing forth vertex shading commands.

For a patch in tessellation, the associated vertices are called control points. The vertex shader stage 10 may perform per-vertex operations such as transformations, skinning, morphing, and per-vertex lighting on the plurality of vertices. When the vertex shader stage 10 is completed, the GPU 100 executes tessellation control shading commands so that the TCS stage 12 can be performed. The TCS stage 12 may receive the control points of the patch, as processed by the vertex shader stage 10, process the control points, and output control points for a processed patch. In other words, the TCS stage 12 receives an input patch and processes the input patch and outputs an output patch. Various functions may be performed herein for processing the input patch, e.g. modifying the coordinates of the control points to change the locations of the control points, or adding or deleting some control points. Based on a determination of how many primitives should be added, the TCS stage 12 may output some values (referred to as tessfactors in the Direct3D 11 API) that indicate how many primitives are to be added to the patch. After the TCS stage 12, the GPU 100 may execute the tessellation primitive generator commands to conduct the TPG stage 14. The TPG stage 14 may tessellate (e.g., divide) the patch into a plurality of primitives according to the values outputted in the TCS stage 12 and output the vertices of the plurality of primitives of the patch to the TES stage 16 in a normalized coordinate system (e.g., a Bary-Centric (u,v,w) coordinate). The function of the TES stage 16 may be to map the vertex coordinates, as received from the TPG stage 14, unto the patch. Once the TES stage 16 is done, the GPU 100 may in turn execute the geometry shading commands to perform the GS stage 18. The GS stage 18 receives the vertices of the primitives added to the patch by the TES stage 16 and may further generate additional vertices for the primitives to add even more resolution.

For those skilled in the art, it is known that further graphics pipeline stages are needed for generating the final graphics image for display, some of which are briefly described below. The rasterizer stage 20 receives the primitives from the GS stage 18 and converts the primitives into pixels for display. The pixel shader stage 22 receives the pixels as outputted by the rasterizer stage 20 and performs post processing to assign color values to each of the pixels that are to be displayed. The output merge stage 24 may perform any final pixel processing (e.g., using depth information to further determine whether any of the pixels should be removed from being displayed) and may output the final pixel values to a frame buffer, usually outside the GPU 100. Typically, it is considered that the TCS stage 12, the TPG stage 14 and the TES stage 16 implement a tessellation process.

Figure 2:
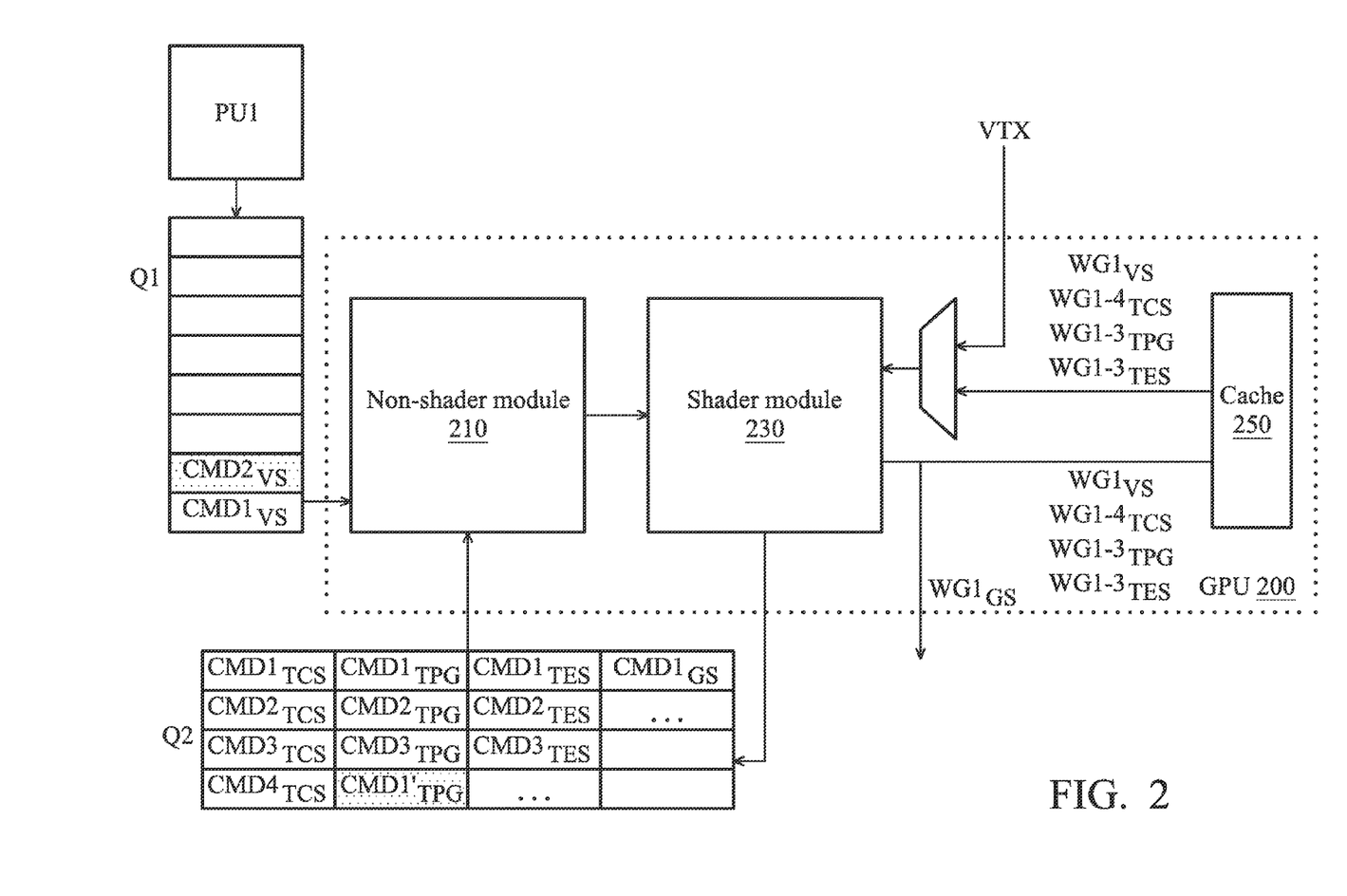
FIG. 2 is an exemplary block diagram of a graphics processing unit according to an embodiment of the invention.

FIG. 2 is an exemplary block diagram of a graphics processing unit (GPU) according to an embodiment of the invention. The GPU 200 may be configured for performing a vertex shading (VS) stage and one or more tessellation stages. The GPU 200 comprises the non-shader module 210, the shader module 230, and the cache 250. The non-shader module 210 is operative at least for the following tasks. Firstly, loading the VS command $CMD1_{VS}$ from the first command queue Q1 to the shader module 230 in performing the VS stage, where the VS command $CMD1_{VS}$ is stored into the first command queue Q1 by the first processing unit PU1. Secondly, loading first tessellation stage commands from the second command queue Q2 to the shader module 230 in performing the first tessellation stage of the one or more tessellation stages. In the following descriptions, unless contradictory with context or explicitly stated otherwise, it is assumed that the first tessellation stage is the TCS stage and the two terms may be used interchangeably. It should be similarly assumed that the first tessellation stage commands are the TCS stage commands $CMD1_{TCS}$, $CMD2_{TCS}$, $CMD3_{TCS}$ and $CMD4_{TCS}$ (collectively referred to as $CMD1\text{-}4_{TCS}$) and the first tessellation stage outputs are $WG1_{TCS}$, $WG2_{TCS}$, $WG3_{TCS}$ and $WG4_{TCS}$ (collectively referred to as $WG1\text{-}4_{TCS}$). However, this is only for illustrative purpose since the first tessellation stage may be the TPG stage instead of the TCS stage and the TCS stage commands may include more or less than 4 commands according to some other embodiments of the invention.

The shader module 230 is operative for doing at least the following tasks. Firstly, executing the VS command $CMD1_{VS}$ for computing the VS stage outputs $WG1_{VS}$ (WG stands for "workgroup", which will be explained in more detail). The VS stage outputs $WG1_{VS}$ may be the varying of the plurality of vertices VTX, where the VS stage takes the plurality of vertices VTX as input data. As described earlier, the VS command $CMD1_{VS}$ may be loaded into the shader module 230 for execution from the first command queue Q1 by the non-shader module 210. Secondly, storing the first tessellation stage commands $CMD1\text{-}4_{TCS}$ into the second command queue Q2 for performing the first tessellation stage of the one or more tessellation stages. Thirdly, the shader module 230 executes the first tessellation commands $CMD1\text{-}4_{TCS}$ for computing the first tessellation stage outputs $WG1_{TCS}$, $WG2_{TCS}$, $WG3_{TCS}$ and $WG4_{TCS}$ (collectively referred to as $WG1\text{-}4_{TCS}$) by taking the VS stage outputs as input data in performing the first tessellation stage of the one or more tessellation stages.

To elaborate more, the major difference among the first tessellation stage commands $CMD1\text{-}4_{TCS}$ is that these 4 commands may operate on different portions of the VS stage outputs $WG1_{VS}$ so as to compute the first tessellation stage outputs $WG1\text{-}4_{TCS}$: $WG1_{TCS}$ computed from $CMD1_{TCS}$, $WG2_{TCS}$ computed from $CMD2_{TCS}$, and so forth. In practice, the first tessellation stage commands $CMD1\text{-}4_{TCS}$ may be generated and stored into the second command queue Q2 by the shader module 230; afterwards, the non-shader module 210 may load the TCS stage commands $CMD1\text{-}4_{TCS}$ to the shader module 230, which then executes the TCS stage commands to compute the first tessellation stage outputs $WG1\text{-}4_{TCS}$.

According to an embodiment of the invention, both the first command queue Q1 and the second command queue Q2 (typically having a capacity less than 1K-byte) are placed physically outside the GPU 200. Yet, according to another embodiment of the invention, these two command queues may locate inside the GPU 200 or even constitute a part of the cache 250. According to another embodiment of the invention, the first processing unit PU1 is a central processing unit (CPU) or a digital signal processor (DSP), which may form a heterogeneous computing system together with the GPU 200. According to still another embodiment of the invention, loading the VS command $CMD1_{VS}$ is initiated by a driver program and a number of the plurality of vertices VTX (i.e., how many vertices VTX contains) is determined by the driver program. Note that besides $CMD1_{VS}$, more VS commands (e.g., $CMD2_{VS}$) may be stored to the first command queue Q1 by the first processing unit PU1. As an example, the driver program receives a request from an API (such as Microsoft's DirectX 11 or OpenGL 4.X); then, the driver program triggers the non-shader module 210 to load the VS command $CMD1_{VS}$; at substantially the same time, the driver program determines the number of the plurality of vertices VTX. In contrast, loading the first tessellation stage commands $CMD1$-$4_{TCS}$ is triggered by the shader module 230 instead of by the driver program.

As mentioned earlier, the shader module 230 executes the VS command $CMD1_{VS}$ in performing the VS stage and executes the first tessellation commands $CMD1$-$4_{TCS}$ in performing the first tessellation stage. Yet, the VS command $CMD1_{VS}$ is stored into the first command queue Q1 by the first processing unit PU1 while the first tessellation commands $CMD1$-$4_{TCS}$ are stored into the second command queue Q2 by the shader module 230 through kernel enqueueing. For the GPU 200, the first command queue Q1 may be regarded as a software command queue, the content of which is enqueued by the first processing unit PU1 other than the GPU 200; whereas the second command queue Q2 may be regarded as a hardware command queue, the content of which being enqueued by the GPU 200 itself.

The cache 250 is operative to store the VS stage outputs $WG1_{VS}$ and the first tessellation stage outputs $WG1$-$4_{TCS}$. In FIG. 2, the VS stage outputs $WG1_{VS}$ are stored to the cache 250 and may be later retrieved from the cache 250 by the shader module 230 for computing the first tessellation stage outputs $WG1$-$4_{TCS}$. Similarly, the first tessellation stage outputs $WG1$-$4_{TCS}$ are stored to the cache 250 for further usage that will be introduced later.

According to an embodiment, the GPU 200 may further comprise a storage management module (not shown explicitly), which may be regarded as a part of the non-shader module 210, a part of the shader module 230 or a distinct portion of the GPU 200. The storage management module is configured for performing a storage management task so as to adjust utilization of the cache 250 by causing the shader module 230 stop executing the VS command $CMD1_{VS}$ and the first tessellation commands $CMD1$-$4_{TCS}$ when the utilization of the cache 250 is above a certain level. For instance, when the storage management module detects that the utilization of the cache 250 is above 80% of its overall capacity when the shader module 230 has executed the first tessellation command $CMD1_{TCS}$ and is about to execute the first tessellation command $CMD2_{TCS}$, the storage management module may send an alarm signal to the shader module 230, which then refrains from executing the first tessellation command $CMD2_{TCS}$ upon seeing such an alarm signal. Therefore, the cache 250 may escape from flushing data to system memory caused by overflow because of data generated from executing the first tessellation command $CMD2_{TCS}$. When the cache 250 no longer needs to maintain the first tessellation stage outputs $WG1_{TCS}$, the storage management module may approve the shader module 230 for continuing to execute the pending first tessellation command $CMD2_{TCS}$.

Figure 3:
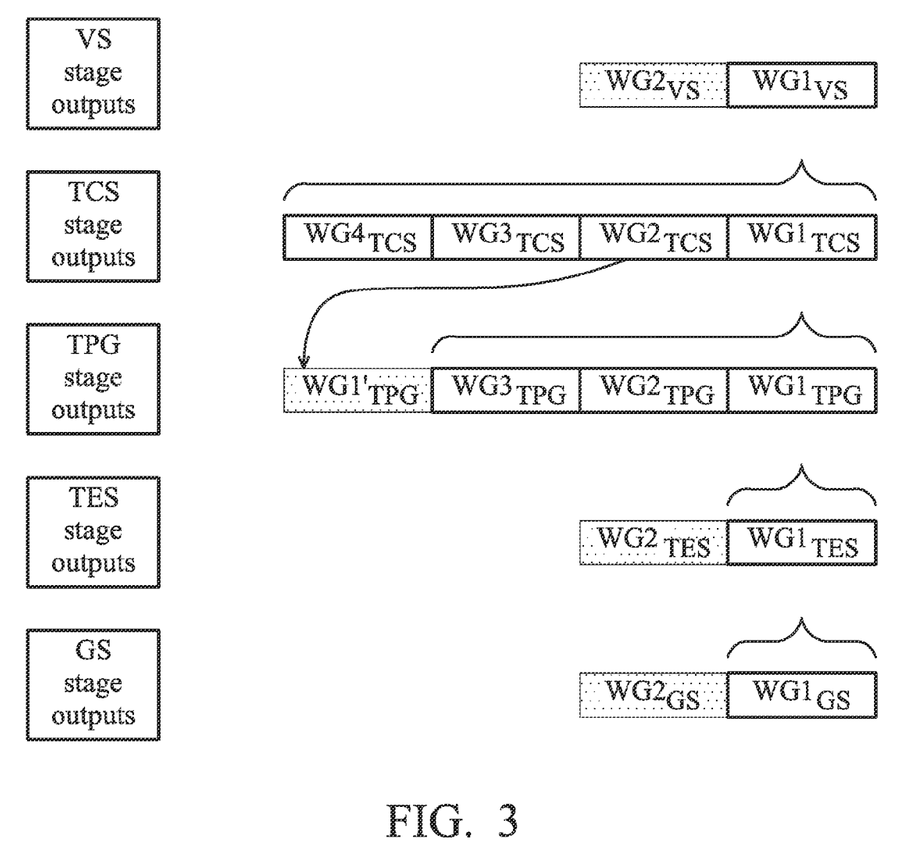
FIG. 3 shows an exemplary output mapping relationship of miscellaneous functional stages for tessellation according to an embodiment of the invention.

FIG. 3 shows an exemplary data output relationship of miscellaneous functional stages for tessellation according to an embodiment of the invention. FIG. 3 is to be understood accompanied with FIG. 2. In FIG. 3, outputs for each of the functional stages are formatted as one or more workgroups: e.g., the TCS stage outputs are the $WG1_{TCS}$, $WG2_{TCS}$, $WG3_{TCS}$, and $WG4_{TCS}$, which may be collectively referred to as TCS stage workgroups. Please firstly focus on the VS stage and the TCS stage in light of the first command queue Q1 and the second command queue Q2 in FIG. 2. The $WG1_{VS}$ is associated with the VS command $CMD1_{VS}$; in other words, when the shader module 230 executes the VS command $CMD1_{VS}$ by using the plurality of vertices VTX as input data, the computational outputs are the $WG1_{VS}$. In one example, the plurality of vertices VTX contains 128 vertices with their own attributes, and the $WG1_{VS}$ contains the varying of the 128 vertices or 128 sets of varying. By taking the $WG1_{VS}$ as input data for the TCS stage, the shader module 230 executes each of the first tessellation stage commands $CMD1$-$4_{TCS}$ on a respective portion of the $WG1_{VS}$ to obtain the $WG1_{TCS}$, $WG2_{TCS}$, $WG3_{TCS}$, and $WG4_{TCS}$, respectively. For the $WG1_{VS}$ containing 128 sets of varying, the first tessellation command $CMD1_{TCS}$ may be applied upon the first 32 sets of varying, the first tessellation command $CMD2_{TCS}$ may be applied upon the second 32 sets of varying, the first tessellation command $CMD3_{TCS}$ may be applied upon the third 32 sets of varying, and the first tessellation command $CMD4_{TCS}$ may be applied upon the last 32 sets of varying.

Moreover, each of the workgroup of $WG1$-$4_{TCS}$ may contain 128 control points. If the $WG1_{VS}$ contains 128 sets of varying, it means 4×128 or 512 control points will be generated from the 128 sets of varying once TCS stage is performed with respect to $WG1_{VS}$. Because of limited capacity of the cache 250 and availability of input data (i.e., whether $WG1_{VS}$ has been generated) for performing the TCS stage, it might be needed to determine how many workgroups to be generated from the $WG1_{VS}$ (the example here directly shows the determination result of 4 TCS stage workgroups) and when can the first tessellation commands $CMD1$-$4_{TCS}$ start to be executed.

Thus, according to an embodiment, the shader module 230 is further configured to do at least the following in performing the first tessellation stage of the one or more tessellation stages. Firstly, calculating the size of the first tessellation stage outputs according to the size of the VS stage outputs $WG1_{VS}$ of the first tessellation stage. Note that at this moment, it is not known how many TCS stage workgroups the first tessellation stage outputs would be grouped into. With the size of the $WG1_{VS}$, the size of the first tessellation stage outputs may be obtained before the execution of the first tessellation stage commands $CMD1$-$4_{TCS}$. Secondly, determining a number of the first tessellation stage commands according to the size of the first tessellation stage outputs and the capacity of the cache 250. Take FIG. 3 as one example, the number of the first tessellation stage commands is determined to be 4, i.e. the first tessellation stage commands are $CMD1_{TCS}$, $CMD2_{TCS}$, $CMD3_{TCS}$ and $CMD4_{TCS}$. This is because the cache 250 may be configured to reserve a portion of its capacity for storing the first tessellation stage outputs. If this portion of the cache 250 is not sufficient to accommodate all the first tessellation stage outputs simultaneously, it is not appropriate to apply only one first tessellation stage command on the $WG1_{VS}$ for computing the first tessellation stage outputs. Instead, executing the first tessellation stage commands CMD1-$4_{TCS}$ in turn so that when TCS4 is being executed, the $WG1_{TCS}$ may be replaceable in the cache 250. Thirdly, detecting the completion of the computation of the VS stage outputs $WG1_{VS}$ as a condition to trigger storing the first tessellation stage commands CMD1-$4_{TCS}$ into the second command queue Q2. In one embodiment, such a detection can be implemented by using a barrier (i.e., an instruction inserted immediately after the VS stage commands), where the barrier is able to detect whether any element (may be referred to as a work item) of the VS stage workgroup $WG1_{VS}$ is obtained already. When all the work items are obtained, computing the VS stage outputs $WG1_{VS}$ is considered to be completed.

In general, the number of the first tessellation stage commands can be a positive integer N (e.g., the first tessellation stage commands are CMD1-$N_{TCS}$) and the first tessellation stage outputs comprise N first tessellation stage workgroups (e.g., WG1-$N_{TCS}$), wherein one of the N first tessellation stage workgroups is computed by the shader module 230 executing one of the N first tessellation stage commands with respect to at least a portion of the VS stage outputs $WG1_{VS}$.

To take further advantage of kernel enqueueing for performing tessellation, it is suggested that the above disclosure be applied to other tessellation stages. Please note the TCS stage outputs $WG1_{TCS}$ and the TPG stage outputs $WG1_{TPG}$, $WG2_{TPG}$, and $WG3_{TPG}$ (collectively referred to as WG1-$3_{TPG}$) in FIG. 2, which can be analogously construed with respect to the relationship of the VS stage outputs $WG1_{VS}$ and the TCS stage outputs WG1-$4_{TCS}$. The TCS stage outputs $WG1_{TCS}$ may be generated as the shader module 230 executes the TCS stage command $CMD1_{TCS}$ by using a portion of the VS stage outputs $WG1_{VS}$ as input data. The TCS stage outputs $WG1_{TCS}$ may have a plurality of control points, which are to be taken as input data for the TPG stage. Here, the TPG stage outputs $WG1_{TPG}$, $WG2_{TPG}$, and $WG3_{TPG}$ are generated as the shader module 230 executes the TPG stage commands $CMD1_{TPG}$, $CMD2_{TPG}$, $CMD3_{TPG}$ (collectively referred to as CMD1-$3_{TPG}$) on a respective portion of the $WG1_{TCS}$. Suppose the TCS stage outputs $WG1_{TCS}$ contain 144 control points, then the TPG stage command $CMD1_{TPG}$ may be associated with the first 48 control points, the TPG stage command $CMD2_{TPG}$ may be associated with the following 48 control points, and the TPG stage command $CMD3_{TPG}$ may be associated with the last 48 control points. Furthermore, each of the TPG stage workgroups $WG1_{TPG}$, $WG2_{TPG}$, and $WG3_{TPG}$ may contain 128 Bary-Centric coordinates, which means 144 control points result in 384 Bary-Centric coordinates once the TPG stage is performed. Because of limited capacity of the cache 250 and availability of input data for performing the TPG stage, a determination might need to be made regarding how many TPG stage workgroups are to be generated from the TCS stage $WG1_{TCS}$ (the example here directly shows the determination result of 3 TPG stage workgroups) and when the TPG stage commands can be executed.

According to an embodiment, the shader module 230 is further configured to do at least the following in performing the TPG stage of the one or more tessellation stages by taking one of the 4 TCS stage workgroups, e.g. $WG1_{TCS}$, as input data. Firstly, calculating the size of the TPG stage outputs according to the size of the $WG1_{TCS}$ and one or more parameters of the TPG stage. An example of the one or more parameters of the TPG stage is the level of detail (LOD) parameter, which mandates how many additional points should emerge on a particular surface. Secondly, determining a number of the TPG stage commands according to the size of the TPG stage outputs and the capacity of the cache 250. As exemplified in FIG. 3, the number of the TPG stage commands is determined to be 3, where each of the TPG stage commands $CMD1-3_{TPG}$, $CMD2_{TPG}$, $CMD3_{TPG}$ corresponds to the TPG stage workgroups $WG1_{TPG}$, $WG2_{TPG}$, and $WG3_{TPG}$, respectively. This implies the shader module 230 later enqueues the TPG stage commands CMD1-$3_{TPG}$ associated with the TCS stage workgroup $WG1_{TCS}$. Thirdly, detecting the completion of the computation of the $WG1_{TCS}$, i.e. whether the 144 control points (assume $WG1_{TCS}$ has 144 control points) are already generated from the execution of the TCS state command $CMD1_{TCS}$. Once $WG1_{TCS}$ is ready, i.e., the completion of the computation of the TCS stage workgroup $WG1_{TCS}$ is detected, the shader module 230 may store the TPG stage commands CMD1-$3_{TPG}$ into the second command queue Q2 through kernel enqueueing. Afterwards, the shader module 230 executes the TPG stage commands CMD1-$3_{TPG}$ from the non-shader module 210 for computing the TPG stage outputs WG1-$3_{TPG}$ from the TCS stage workgroup $WG1_{TCS}$. It has to be emphasized that the TPG stage commands CMD1-$3_{TPG}$ are loaded from the second command queue Q2 and the TPG stage outputs WG1-$3_{TPG}$ are stored in the cache 250. By treating the TCS stage as the first tessellation stage, the TPG stage may be regarded as a second tessellation stage.

In practice, the second tessellation stage may be one of the TPG stage and the TES stage and the number of the second tessellation stage commands may be a positive integer M, where the M second tessellation stage commands may be associated with one of the N first tessellation stage workgroups with N also being a positive integer. Therefore, according to another embodiment of the invention, the second tessellation stage is one of the TPG state and a tessellation evaluation shader (TES) stage, and wherein the number of the second tessellation stage commands is M and the second tessellation stage outputs comprise M second workgroups, wherein one of the M second workgroups is computed by the shader module executing one of the M second tessellation commands with respect to at least a portion of the one of the N first workgroup, and M is a positive integer.

Since the relationship between TPG stage outputs and the TES stage outputs can be similarly understood as discussed above, please focus on the TES stage outputs $WG1_{TES}$ and the GS stage outputs $WG1_{GS}$ in FIG. 3 together with FIG. 2. Because of the nature of the GS stage, the TES workgroup $WG1_{TES}$ is associated with the GS workgroup $WG1_{GS}$ only. In one embodiment, the GS stage outputs are stored to a memory buffer accessible by the first processing unit PU1 rather than the cache 250. The memory buffer may be a system DRAM, for which capacity is almost unlimited. This suggests there might be no need to make use of several GS stage commands to avoid the overflow of the cache 250 in contrast to the TCS, TPG and the TES stages. So, according to another embodiment, the shader module 230 is further configured to do at least the following in performing the GS stage by taking the TES stage workgroup $WG1_{TES}$ as input data. Firstly, calculating the size of the GS stage outputs or the GS stage workgroup $WG1_{GS}$ according to the size of the TES workgroup $WG1_{TES}$. Then, detecting the completion of the computation of the TES workgroup $WG1_{TES}$. If the $WG1_{TES}$ has 128 vertices, the completion will only be detected when the 128 vertices have all been obtained. The shader module 230 may store the GS stage command $CMD1_{GS}$ into the second command queue Q2 through kernel enqueueing when the completion of the computation of the TES stage workgroup $WG1_{TES}$ is detected. Later, the shader module 230 executes the GS stage command $CMD_{GS}$ from the non-shader module 210 for computing the GS stage outputs $WG1_{GS}$ from the TES stage workgroup $WG1_{TES}$.

As the GPU 200 takes charge of executing the one or more tessellation stages in the manner described above, two practical problems may need to be dealt with. The first is to associate the data outputted by various tessellation stages. This is because the GPU 200 itself usually benefits from parallel processing, such as adopting single-instruction-multiple-data (SIMD) or single-instruciton-multiple-threads (SIMT) architecture. With such parallelism, the order of the computation results does not necessarily maintain the order of their corresponding inputs. For example, as the GPU 200 computes the $WG1_{TCS}$ and its derivative data (e.g., WG1-$3_{TPG}$), the $WG2_{TCS}$ and its derivative data (i.e., $WG1'_{TPG}$ generated from the execution of the $CMD1'_{TPG}$ shown in FIG. 2) may be computed simultaneously. These data may be mixed when observed in time and the later graphics pipeline stage may be confused about which data should be rendered with each other. The data mixed situation may be more complicated if, besides the VS stage workgroup $WG1_{VS}$ and its derivative data (e.g. WG1-$4_{TCS}$, WG1-$3_{TPG}$, $WG1_{TES}$ shown in FIG. 3), another VS stage workgroup $WG2_{VS}$ and its derivative data (not shown) are computed as well.

Figure 4:
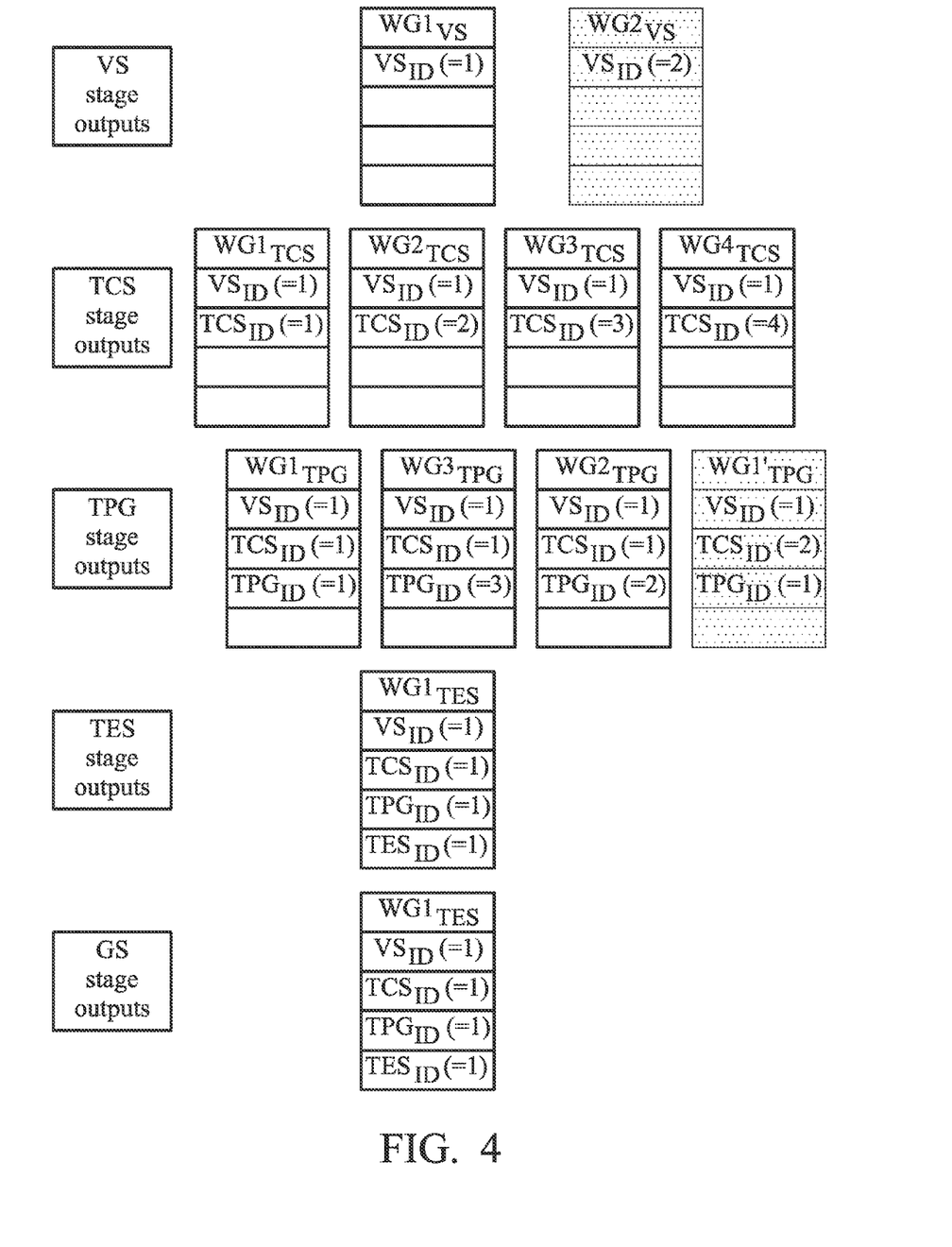
FIG. 4 illustrates a data alignment scheme for outputs of tessellation stages according to an embodiment of the invention.

FIG. 4 illustrates a data alignment scheme for outputs of tessellation stages according to an embodiment of the invention. It is shown that one or more tessellation stage ID is associated with each of the workgroups when a respective tessellation stage output is generated. For instance, the TPG stage outputs $WG1_{TPG}$ is associated with the $VS_{ID}$, the $TCS_{ID}$, and the $TPG_{ID}$, assigned with a value of 1, 1 and 1, respectively. In contrast, for the TPG stage workgroup $WG1'T_{PG}$ generated from the TCS stage outputs $WG2_{TCS}$, the $TCS_{ID}$ will be set to 2, enabling distinguishing between $WG1'_{TPG}$ and $WG1_{TPG}$. Likewise, assigning $WG2_{VS}$ and all its derivate data with $VS_{ID}$ being 2 avoid confusion with $WG1_{VS}$ and its derivate data (since their $VS_{ID}$ is 1). In practice, a pipe data structure (defined in OpenCL 2.0) may be utilized to carry information of each of the workgroups and its associated IDs and the pipe data structure may be stored within the cache 250 (shown in FIG. 2) physically.

Besides the data alignment problem, the GPU 200 may need to keep track of the execution of the commands. Please turn back to FIG. 2 briefly. With the GPU 200 controlling the flow of executing the commands enqueued in the first command queue Q1 and the second command queue Q2, it has to be known which commands have been executed and which have not. To do this, some IDs are associated with each of the commands shown in a similar way as described regarding the data alignment scheme in FIG. 4. In one embodiment, the non-shader module 210 may further comprise a command ID generator for associating command IDs with the tessellation stage commands. For instance, the $CMD2_{TPG}$ may be associated with a $VS_{ID}$ (=1), a $TCS_{ID}$ (=1), and a $TPG_{ID}$ (=2) so as to distinguish itself from the $CMD3_{TPG}$, which is associated with a $VS_{ID}$ (=1), a $TCS_{ID}$ (=1), and a $TPG_{ID}$ (=3). In this way, when a command is to be executed the command ID generator generates associated IDs with the command and update which commands have been executed.

Figure 5:
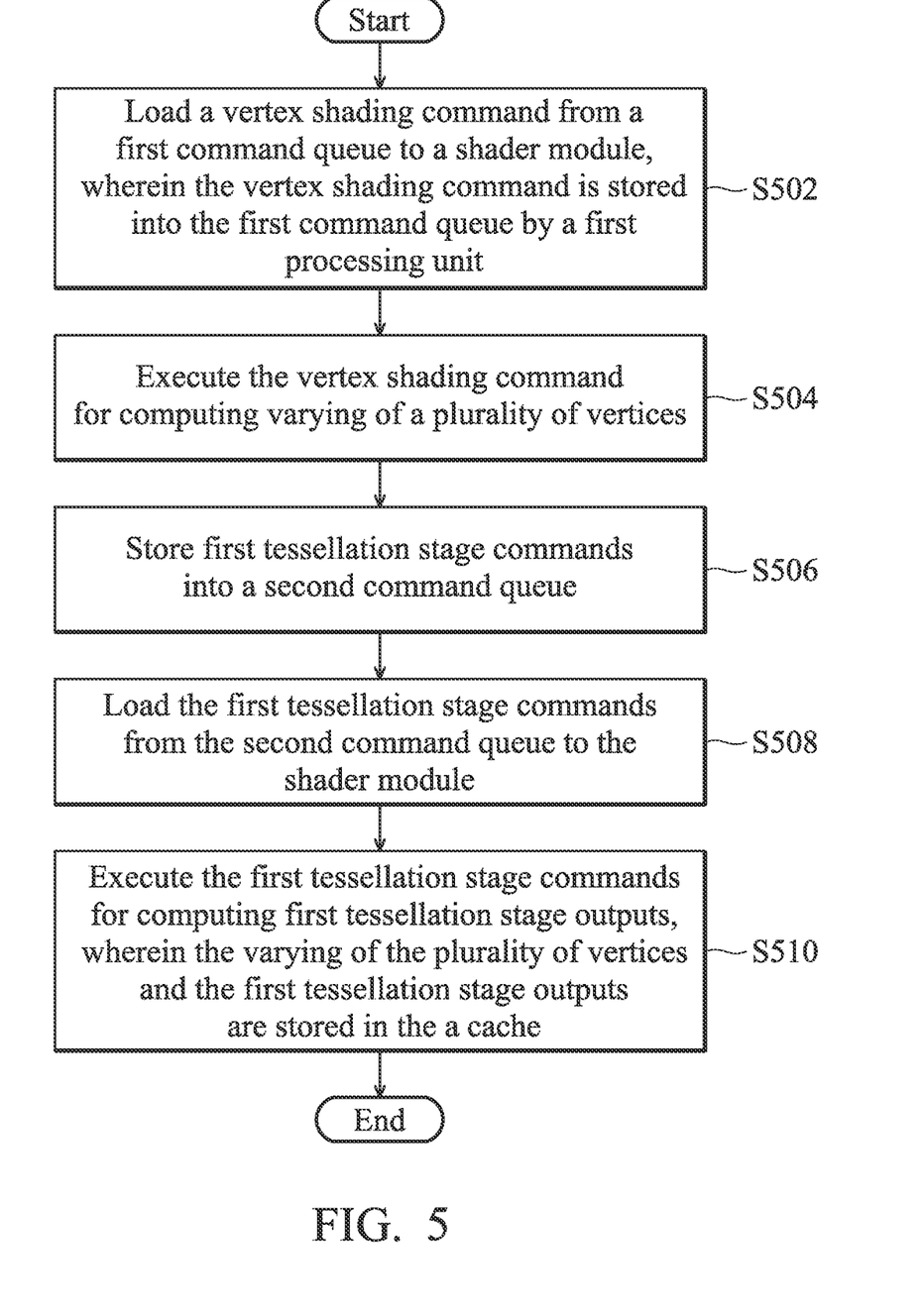
FIG. 5 is a flow chart depicting a rendering method for performing tessellation according to still another embodiment of the invention.

FIG. 5 is a flow chart depicting a rendering method for performing one or more tessellation stages according to still another embodiment of the invention. In one embodiment, the rendering method may be executed by the apparatus as shown in FIG. 1. In step S502, a vertex shading command is loaded from a first command queue to the shader module 230, where the vertex shading command is stored into the first command queue by a first processing unit. Then the vertex shading command is executed for computing the varying of a plurality of vertices (step S504). The two steps S502 and S504 may be understood for performing a vertex shading operation by taking the plurality of vertices as input data. Next, the following steps are executed for performing a first tessellation stage of the one or more tessellation stages by taking the varying of the plurality of vertices as input data. In step S506, first tessellation stage commands are stored into a second command queue. And, the first tessellation stage commands are loaded from the second command queue to the shader module (step S508). The first tessellation stage commands are executed for computing first tessellation stage outputs, where the varying of the plurality of vertices and the first tessellation stage outputs are stored in a cache (step S510).

In contrast, the conventional approach where a CPU coordinates a GPU through a shared memory for carrying out tessellation process may suffer the drawbacks below. Firstly, during the tessellation process, there are continual traffics of intermediate data and/or instruction accessing from the shared memory in that outputs of a previous tessellation stage (e.g., the TCS stage 12) may need to be written to the shared memory before being read from the shared memory to serve as inputs for the next tessellation stage (e.g., the TPG stage 14). Henceforth, the memory bandwidth overhead may be high. Secondly, the CPU needs to intervene once in a while by issuing the next tessellation stage instructions to keep the tessellation process moving. This might cause the efficiency of the CPU to be low, which in turn degrades the overall system performance. With this invention, these two issues can be efficiently solved.

Figure 6:
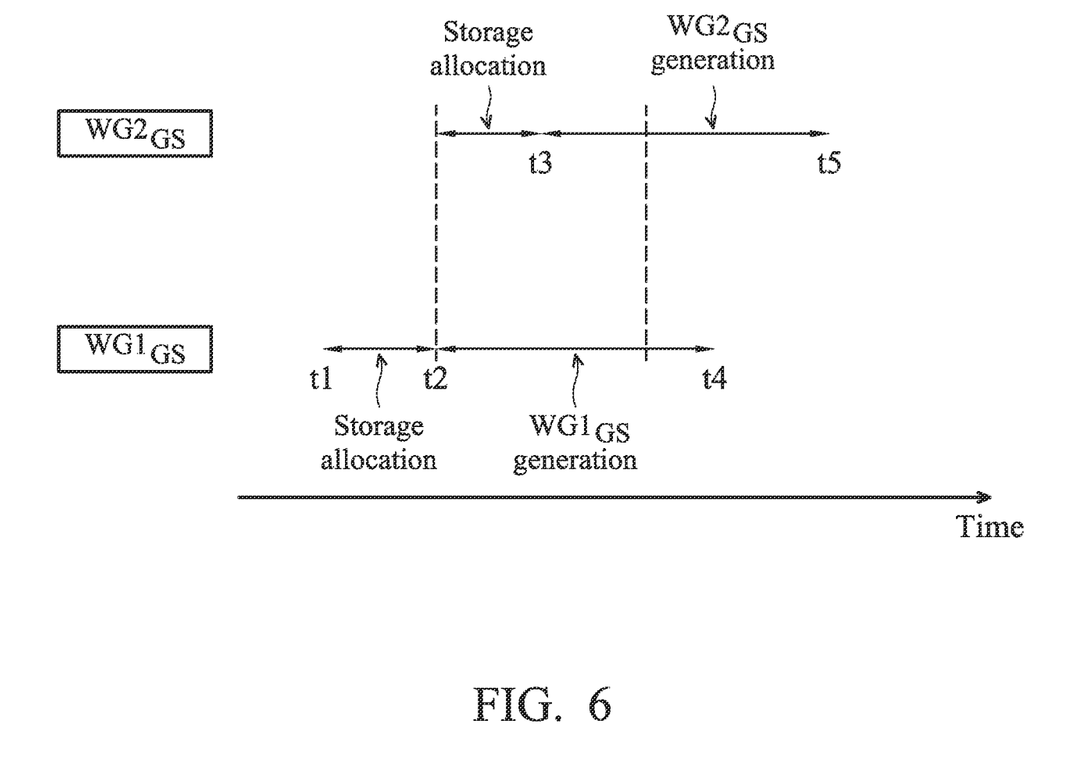
FIG. 6 is a timing chart illustrating a geometry shading stage output method according to an embodiment of the invention.

FIG. 6 is a timing chart illustrating a geometry shading stage output method according to an embodiment of the invention. Please refer to FIG. 6 together with FIG. 3. Consider the geometry shading (GS) stage outputs workgroups $WG1_{GS}$ (generated from $WG1_{TES}$) and $WG2_{GS}$ (generated from $WG2_{TES}$), where $WG1_{TES}$ and $WG2_{TES}$ are two workgroups among M workgroups generated as TES stage outputs with M>=2. Since $WG1_{Gs}$ and $WG2_{GS}$ are to be accessed by GPU pipeline stages behind GS stage, it is preferred that data bits of $WG1_{GS}$ and/or $WG2_{GS}$ are stored nearby physically (e.g. at consecutive address space of a DRAM). However, because of the characteristics of parallel processing, $WG1_{GS}$ and/or $WG2_{GS}$ may be outputted out-of-order. In other words, $WG1_{GS}$ may be produced before $WG2_{GS}$ and vice versa. Specifically, some portions $WG1_{GS}$ may be produced before some portions of $WG2_{GS}$ while some other portions $WG1_{GS}$ may be produced after some other portions of $WG2_{GS}$.

Shown in FIG. 6, storage space for $WG1_{GS}$ is allocated (or reserved) during the time period t1 to the time period t2. From the time period t1 to the time period t2, the shader module 230 (shown in FIG. 2) may perform some analysis based on $WG1_{TES}$ to know the size of $WG1_{GS}$ so that the shader module 230 may know how large storage space should be allocated to $WG1_{GS}$. Afterwards, storage space for $WG2_{GS}$ is allocated (reserved) by the shader module 230 during the time period t2 to the time period t3. In brief, the shader module 230 allocates memory spaces for $WG1_{GS}$ and $WG2_{GS}$ in-order.

Once the storage spaces for $WG1_{GS}$ and $WG2_{GS}$ are reserved in-order, the shader module 230 generates $WG1_{GS}$ and $WG2_{GS}$ (and writes $WG1_{GS}$ and $WG2_{GS}$ to respective storage spaces of the memory buffer) out-of-order. Referring to FIG. 6, $WG1_{GS}$ is generated during the time period t2 to the time period t4 whereas $WG2_{GS}$ is generated during the time period t3 to the time period t5, which means $WG1_{GS}$ and $WG2_{GS}$ are generated in overlapped time intervals. With the pre-allocated storage spaces, $WG1_{GS}$ and $WG2_{GS}$ can be written to consecutive entries of the memory buffer even though they're outputted out-of-order.

Hence, according to one embodiment of the invention, the shader module 230 allocates a first storage space within a memory buffer (e.g. a DRAM) for GS stage outputs corresponding to $WG1_{TES}$ (i.e. $WG1_{GS}$) and allocates a second storage space within the memory buffer for GS stage outputs corresponding to $WG2_{TES}$ (i.e. $WG2_{GS}$) in-order. The shader module 230 detects completion of computation of $WG1_{TES}$ and $WG2_{TES}$ and then stores two geometry shading stage commands into the second command queue (shown in FIG. 2) through kernel enqueue when the completion of computation of $WG1_{TES}$ and $WG2_{TES}$ is detected. Then, the shader module 230 executes the two geometry shading stage commands for computing geometry shading stage outputs $WG1_{GS}$ and $WG2_{GS}$ from $WG1_{TES}$ and $WG2_{TES}$. Later, the shader module 230 stores the GS stage outputs corresponding to $WG1_{TES}$ (i.e. $WG1_{GS}$) to the first storage space within the memory buffer and the GS stage outputs corresponding to $WG2_{TES}$ (i.e. $WG2_{GS}$) to the second storage space within the memory buffer out-of-order.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A rendering method executed by a graphics processing unit (GPU) comprising a shader module, a non-shader module and a cache for performing a plurality of tessellation stages, the method comprising the steps of:
    performing a vertex shading operation by taking a plurality of vertices as first input data, comprising:
        loading a vertex shading command from a first command queue to the shader module, wherein the vertex shading command is stored into the first command queue by a first processing unit; and
        executing the vertex shading command for computing varying of the plurality of vertices; and
    performing a first tessellation stage of the plurality of tessellation stages by taking the varying of the plurality of vertices as second input data, comprising:
        storing first tessellation stage commands into a second command queue;
        loading the first tessellation stage commands from the second command queue to the shader module;
        executing the first tessellation commands for computing first tessellation stage outputs;
        calculating a size of the first tessellation stage outputs at least according to a size of the varying of the plurality of vertices;
        determining a number of first tessellation stage commands according to the size of the first tessellation stage outputs and a capacity of the cache; and
        detecting completion of computation of the varying of the plurality of vertices as a condition to trigger storing, through kernel enqueueing, the first tessellation stage commands into the second command queue,
    wherein the varying of the plurality of vertices and the first tessellation stage outputs are stored in the cache.

2. The rendering method of claim 1, wherein the first tessellation stage is one of a tessellation control shader (TCS) stage and a tessellation primitive generator (TPG) stage.

3. The rendering method of claim 1, wherein the first processing unit is one of a central processing unit (CPU) and a digital signal processor (DSP).

4. The rendering method of claim 1, wherein the number of first tessellation stage commands is N and the first tessellation stage outputs comprise N first workgroups, wherein one of the N first workgroups is computed by the shader module executing one of the N first tessellation commands with respect to at least a portion of the varying of the plurality of vertices, and N is a positive integer.

5. The rendering method of claim 4, further comprising performing a second tessellation stage of the plurality of tessellation stages by taking one of the N first workgroups as third input data, comprising:
    calculating a size of second tessellation stage outputs according to a size of the one of the N first workgroups and one or more parameters of the second tessellation stage;
    determining a number of second tessellation stage commands according to the size of the second tessellation stage outputs and the capacity of the cache;
    detecting completion of computation of the one of the N first workgroups;
    storing the second tessellation stage commands into the second command queue through kernel enqueueing when the completion of computation of the one of the N first workgroups is detected;
    loading the second tessellation stage commands from the second command queue to the shader module; and
    executing the second tessellation commands for computing the second tessellation stage outputs from the one of the N first workgroups,
    wherein the second tessellation stage outputs are stored in the cache.

6. The rendering method of claim 5, wherein the second tessellation stage is one of a tessellation primitive generator (TPG) stage state and a tessellation evaluation shader (TES) stage, and wherein the number of the second tessellation stage commands is M and the second tessellation stage outputs comprise M second workgroups, wherein one of the M second workgroups is computed by the shader module executing one of the M second tessellation commands with respect to at least a portion of the one of the N first workgroups, and M is a positive integer.

7. The rendering method of claim 6, wherein the second tessellation stage is the TES stage, and the rendering method further comprises performing a geometry shading (GS) stage to process the M second workgroups, wherein processing of two of the M second workgroups comprises:
    allocating a first storage space within a memory buffer for geometry shading stage outputs corresponding to one of the two second workgroups and a second storage space within the memory buffer for geometry shading stage outputs corresponding to the other of the two second workgroups in-order;
detecting completion of computation of the two second workgroups;
storing two geometry shading stage commands into the second command queue through kernel enqueueing when the completion of computation of the two second workgroups is detected;
loading the two geometry shading stage commands from the second command queue to the shader module;
executing the two geometry shading stage commands for computing geometry shading stage outputs from the two second workgroups; and
storing the geometry shading stage outputs corresponding to the one of the two second workgroups to the first storage space within the memory buffer and the geometry shading stage outputs corresponding to the other of the two second workgroups to the second storage space within the memory buffer out-of-order.

8. The rendering method of claim 1, wherein the step of loading the vertex shading command is initiated by a driver program and a number of the plurality of vertices is determined by the driver program.

9. The rendering method of claim 1, further comprising:
performing a storage management task so as to adjust utilization of the cache by pausing execution of the vertex shading command, the first tessellation commands, or the second tessellation commands when utilization of the cache is above a certain level.

10. A graphics processing unit (GPU) for performing a vertex shading operation and a plurality of tessellation stages, wherein the GPU comprises:
a non-shader module for:
loading a vertex shading command from a first command queue in performing the vertex shading operation, wherein the vertex shading command is stored into the first command queue by a first processing unit; and
loading first tessellation stage commands from a second command queue in performing a first tessellation stage of the plurality of tessellation stages;
a shader module for:
executing the vertex shading command from the non-shader module for computing varying of a plurality of vertices in performing the vertex shading operation, wherein the vertex shading operation takes the plurality of vertices as first input data;
storing the first tessellation stage commands into the second command queue in performing the first tessellation stage of the plurality of tessellation stages; and
executing the first tessellation commands from the non-shader module for computing first tessellation stage outputs by taking the varying of the plurality of vertices as second input data in performing the first tessellation stage of the plurality of tessellation stages; and
wherein the shader module is further configured to do at least the following in performing the first tessellation stage of the plurality of tessellation stages:
calculating a size of the first tessellation stage outputs at least according to a size of the varying of the plurality of vertices;
determining a number of the first tessellation stage commands according to the size of the first tessellation stage outputs and a capacity of the cache; and
detecting completion of computation of the varying of the plurality of vertices as a condition to trigger said storing, through kernel enqueueing, the first tessellation stage commands into the second command queue,
a cache for storing the varying of the plurality of vertices and the first tessellation stage outputs.

11. The GPU of claim 10, wherein the first tessellation stage is one of a tessellation control shader (TCS) stage and a tessellation primitive generator (TPG) stage.

12. The GPU of claim 10, wherein the first processing unit is one of a central processing unit (CPU) and a digital signal processor (DSP).

13. The GPU of claim 10, wherein the number of the first tessellation stage commands is N and the first tessellation stage outputs comprise N first workgroups, wherein one of the N first workgroups is computed by the shader module executing one of the N first tessellation commands with respect to at least a portion of the varying of the plurality of vertices and N is a positive integer.

14. The GPU of claim 13, wherein the shader module is further configured to do at least the following in performing a second tessellation stage of the plurality of tessellation stages by taking one of the N first workgroups as third input data:
calculating a size of second tessellation stage outputs according to a size of the one of the N first workgroups and one or more parameters of the second tessellation stage;
determining a number of second tessellation stage commands according to the size of the second tessellation stage outputs and the capacity of the cache;
detecting completion of computation of the one of the N first workgroups;
storing the second tessellation stage commands into the second command queue through kernel enqueueing when the completion of computation of the one of the N first workgroups is detected; and
executing the second tessellation commands for computing the second tessellation stage outputs from the one of the N first workgroups,
wherein the second tessellation stage commands are loaded from the second command queue to the shader module and the second tessellation stage outputs are stored in the cache.

15. The GPU of claim 14, wherein the second tessellation stage is one of the TPG state and a tessellation evaluation shader (TES) stage, and wherein the number of the second tessellation stage commands is M and the second tessellation stage outputs comprise M second workgroups, wherein one of the M second workgroups is computed by the shader module executing one of the M second tessellation commands with respect to at least a portion of the one of the N first workgroups and M is a positive integer.

16. The GPU of claim 15, wherein the second tessellation stage is the TES stage and the shader module is further configured to perform a geometry shading (GS) stage by processing the M second workgroups, wherein processing of two of the M second workgroups comprises:
allocating a first storage space within a memory buffer for geometry shading stage outputs corresponding to one of the two second workgroups and a second storage space within the memory buffer for geometry shading stage outputs corresponding to the other of the two second workgroups in-order;
detecting completion of computation of the two second workgroups;

storing two geometry shading stage commands into the second command queue through kernel enqueueing when the completion of computation of the two second workgroups is detected;

executing the two geometry shading stage commands for computing geometry shading stage outputs from the two second workgroups; and storing the geometry shading stage outputs corresponding to the one of the two second workgroups to the first storage space within the memory buffer and the geometry shading stage outputs corresponding to the other of the two second workgroups to the second storage space within the memory buffer out-of-order.

17. The GPU of claim 10, wherein the step of loading the vertex shading command is initiated by a driver program and a number of the plurality of vertices is determined by the driver program.

18. The GPU of claim 10, further comprising a storage management module configured for:

performing a storage management task so as to adjust utilization of the cache by pausing execution of the vertex shading command, the first tessellation commands, or the second tessellation commands when utilization of the cache is above a certain level.

* * * * *